United States Patent [19]

Nishikawa

[11] Patent Number: 4,462,674
[45] Date of Patent: Jul. 31, 1984

[54] COPYING APPARATUS OF MOVING DOCUMENT TYPE CAPABLE OF COPYING AN OPTICAL IMAGE PROJECTED FROM AN OPTION DEVICE

[75] Inventor: Masaji Nishikawa, Hachioji, Japan

[73] Assignee: Olympus Optical Company Ltd., Tokyo, Japan

[21] Appl. No.: 249,632

[22] Filed: Mar. 31, 1981

[30] Foreign Application Priority Data

Apr. 1, 1980 [JP] Japan .................... 55-41157

[51] Int. Cl.³ .......................... G03G 15/00
[52] U.S. Cl. .................... 355/3 R; 355/11; 355/46; 355/66
[58] Field of Search ............ 355/3 R, 5, 11, 46, 355/66, 71

[56] References Cited

U.S. PATENT DOCUMENTS

| | | | |
|---|---|---|---|
| 3,833,296 | 9/1974 | Vola et al. | 355/66 X |
| 4,077,714 | 3/1978 | Komori et al. | 355/66 X |
| 4,080,064 | 3/1978 | Komori et al. | 355/11 X |
| 4,111,542 | 9/1978 | Mailloux et al. | 355/14 R |
| 4,170,412 | 10/1979 | Grace et al. | 355/11 X |
| 4,178,093 | 12/1979 | Yanagawa et al. | 355/1 X |

FOREIGN PATENT DOCUMENTS 44-8437  4/1969  Japan .
52-127827  9/1977  Japan .

*Primary Examiner*—R. L. Moses
*Attorney, Agent, or Firm*—Fleit, Jacobson, Cohn & Price

[57] ABSTRACT

A copying apparatus of the moving document type capable of copying an optical image projected from an option or accessory device. The copying apparatus comprises an additional optical path adjacently provided to an optical path of the fixed optical system of the copying apparatus, and a shutter mechanism for opening and closing the additional optical path. The shutter mechanism is opened when the option device is added to the copying apparatus, thereby to directly project on the photosensitive member through the additional optical path an optical image formed by the option device.

8 Claims, 9 Drawing Figures

FIG_2a
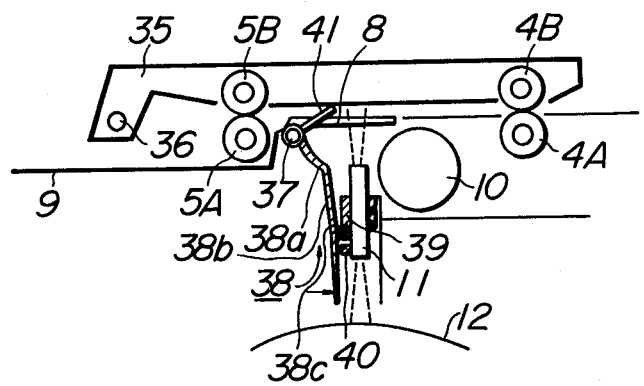
FIG_2b
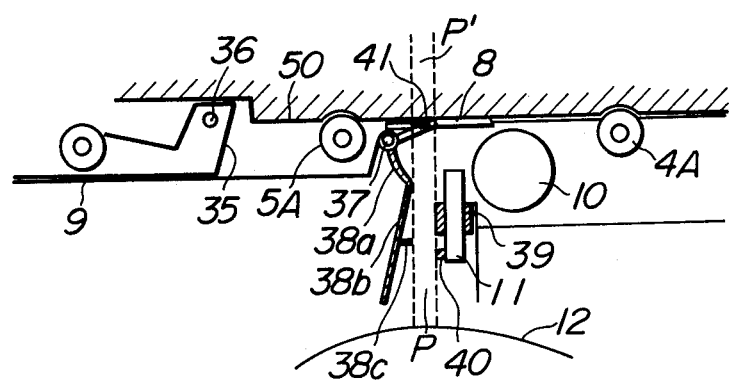

COPYING APPARATUS OF MOVING DOCUMENT TYPE CAPABLE OF COPYING AN OPTICAL IMAGE PROJECTED FROM AN OPTION DEVICE

BACKGROUND OF THE INVENTION

The present invention relates to a copying apparatus comprising a fixed optical system for making a slit exposure and means for moving and scanning a document so as to scan and expose the document as it moves, and also to copy an optical image projected from a separately added option device.

The copying apparatus represented by an electrophotographic copying apparatus has practically been used in many ways for the purpose of copying documents, and almost all of the copying apparata are constructed to obtain a copy of the same size from a sheet-like or book-like document. On the other hand, an apparatus that copies a document that is reduced or enlarged and printed is also known, But such apparatus is permanently assembled as part of a copying apparatus, and, as or in the case using an option or accessory device, use is made of the same optical path as that of the copying apparatus itself or use is made of a part of an optical path of the copying apparatus itself in common. It is a common technique to inseparably assemble a reduction optical system in the copying apparatus itself, but the thus assembled apparatus becomes large and complicated. In the case of adding a detachable optical image projector to the copying apparatus itself as an option device, such apparatus also has various defects. For example, in Japanese Patent Application Publication No. 4,944/67, Japanese Patent Application Publication No. 8,437/69, Japanese Patent Laid-open No. 62,724/76, Japanese Utility Model Laid-open No. 127,827/77, Japanese Patent Laid-open No. 55,647/77 and the like, there is disclosed that the whole image surface of a microfilm image is projected on a document table or a photosensitive member as a still picture by an option device and the projected image is scanned and exposed in the former apparatus by a scanning optical system, while in the latter apparatus the projected image is directly converted into an electrostatic latent image. However, the copying apparatus for copying the whole image surface of a microfilm image simultaneously projected as a still picture is as large as the the apparatus itself and lacks versatility and convenience as compared with the copying apparatus of a document moving, scanning and exposing type which has recently found acceptance. In the former system for projecting the microfilm image on the document table, when an enlarged image is projected by an option device, it is necessary to provide a long optical path, so that the option device becomes disadvantageously large.

SUMMARY OF THE INVENTION

An object of the present invention is to eliminate the above described disadvantages of the conventional copying apparatus.

Another object of the present invention is to provide a copying apparatus comprising a fixed optical system for making a slit exposure and means for moving and scanning a document to scan and expose the document as it moves, in which an optical image formed by an option device is directly projected on the photosensitive member thereby copying it on a recording member.

According to the present invention there is provided a copying apparatus comprising a fixed light source, a fixed optical system for making a slit exposure, means for moving and scanning a document, a photosensitive member arranged to receive an optical image formed by the optical system in synchronization with the scanning of the document, an option device capable of being added to the apparatus in order to copy an optical image projected from the option device, an additional optical path provided adjacent to an optical path of the fixed optical system of the copying apparatus, and a shutter mechanism for opening and closing the additional optical path, whereby the shutter mechanism is opened when the option device is added to the copying apparatus, thereby to directly project on the photosensitive member through the additional optical path an optical image formed by the option device. The additional optical path has one end exposed to the outside of the copying apparatus and the other end opposed to the photosensitive member. The shutter mechanism comprises a vertically elongated plate-like shutter member having one end held by a pivot for intercepting the additional optical path, a lever extended to the side of the pivot opposite to the shutter member and for opening the additional optical path when the option device is added to the copying apparatus, and a spring member for biasing the shutter member to the additional optical path closing direction. The shutter member consists of a curved reflecting mirror portion, a straight light intercepting plate portion and a projecting portion extended in the direction at right angles thereto. The shutter mechanism comprises a shutter member having one end held by a pivot for intercepting the additional optical path, a solenoid connected to the shutter member for opening the additional optical path when the option device is added to the copying apparatus, and a spring member connected to end of the shutter member for always biasing the shutter member to the additional optical path closing direction. The shutter member has a projecting member provided at the end portion of the shutter member opposite to the pivotal end and extended in the direction at right angles thereto.

According to the copying apparatus of the present invention, when an optical image projected from an option device is copied, an optical system for making a slit exposure of the copying apparatus itself is not used, so that it is particularly preferable to apply to a copying apparatus which uses, as an optical system for making a slit exposure, a focusable light transmission array which is difficult to be confluent for using an optical system because of a short optical path.

BRIEF DESCRIPTION OF THE DRAWING

FIGS. 2a and 2b are sectional views schematically showing one embodiment of a shutter drive mechanism for opening and closing an additional optical path of a copying apparatus according to the present invention;

DESCRIPTION OF THE PREFERRED EMBODIMENT

Figure 1:
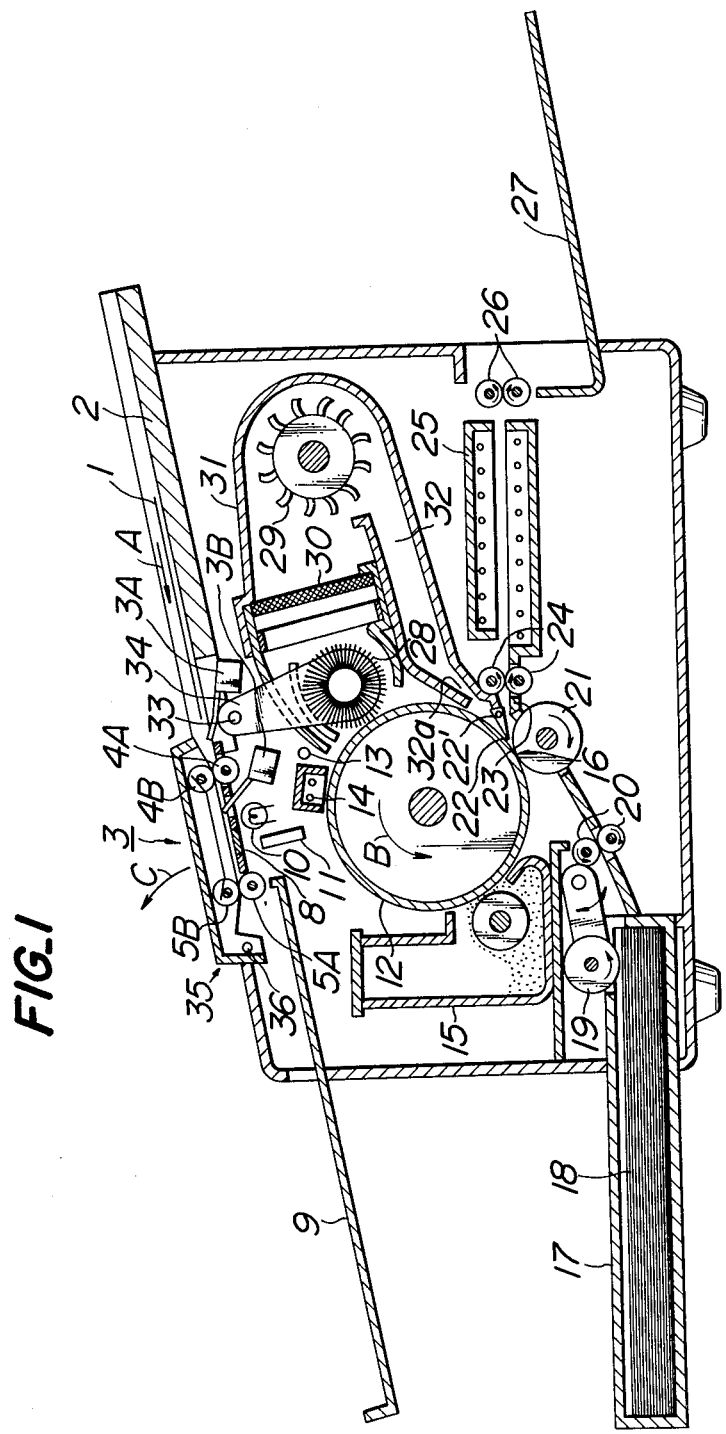
FIG. 1 is a sectional view showing one embodiment of a known copying apparatus of a slit exposure and scanning type in which it is preferable to apply the present invention.

Referring now to the drawings, wherein the same reference characters designate the same or corresponding parts throughout the several views, FIG. 1 shows one embodiment of a conventional electrophotographic copying apparatus, to which the present invention is preferably applied. The copying apparatus in this embodiment is a type for carrying out scanning and exposure by fixing a scanning optical system and moving a document. In this copying apparatus, a sheet-like document 1 is placed on an inclined document table 2, inserted into a document feeder 3 from the direction of an arrow A, moved by document carrying rollers 4A, 4B and 5A, 5B provided in the document feeder 3, and discharged on a document tray 9.

During this feeding period, the document 1 is illuminated by an illumination lamp 10 such as a fluorescent lamp, and a document image is projected on a rotating photosensitive drum 12 by an optical system for making a slit exposure 11 consisting of a focusable light transmission array through a transparent glass plate (a stage glass) 8. The photosensitive drum 12 comprising a photoconductive layer consisting of, for example, Se is, rotated in the direction of an arrow B, and any residual charge on the drum is discharged by a discharge lamp 13, thereafter the drum is uniformly charged by a corona discharge device 14, and an electrostatic latent image is formed on the drum by projecting the optical image of document onto the uniformly charged drum. This electrostatic image is developed with toner by a dry developing device 15 using a developing agent of two compositions and is carried to a toner image transfer section 16 according to rotation of the photosensitive drum 12. On the other hand, recording papers 18 provided in a cassette 17 for a recording paper are taken out one by one by a vibrating and rotating pickup roller 19 and sent to the toner image transfer section 16 by registering rollers 20 at a predetermind timing. In the toner image transfer section 16, the recording paper is conveyed between a bias transfer roller 21 supplied with a bias voltage and the photosensitive drum 12 so as to superimpose it on the toner image thereby to transfer a toner image on the paper. In this case, the recording paper 18 is closely carried to the toner image, i.e., the photosensitive drum 12, so that the paper is peeled off by a peeling claw 22 and an air flow which will be explained later on, conveyed along a guide 22', and fed into a fixing device 25 having a heater by means of a carrying roller 24 through a guide plate 23, and then the toner image is fixed therein, and finally the paper is discharged on a copy tray 27 by a discharging roller 26. The toner image formed on the photosensitive drum 12 is not completely transferred to the recording paper, but a part thereov remains so that the remaining toner particles are brushed off by a rotating cleaner brush 28, the thus brushed-off toner particles are carried away by an air flow generated by rotation of a fan 29 and collected by a filter 30. The cleaner brush 28 and the fan 29 are covered with a housing 31 for obtaining an effective toner absorption force and for preventing the toner from dispesing in the apparatus. Exhausted air of the fan 29 is guided to a duct 32. An exhaust port 32a of the duct 32 is faced to the toner image transfer section 16 so as to act together with the claw 22 thereby effectively peeling the recording paper from the photosensitive drum 12. The cleaner brush 28 is rotatably pivoted on an arm 34 rotatably mounted around a supporting shaft 33. An electrostatic latent image once formed on the photosensitive drum 12 is repeatedly used, the toner developing and transferring steps are repeated, and in case of multiple copying in which the toner image is successively transferred onto a plurality of sheets of recordng paper, the cleaner brush 28 is separated from the photosensitive drum 12. In addition, an upper carrying mechanism 35 of the document feeder 3 is so constructed that it can be opened and closed around a shaft 36 in the direction shown by an arrow C. In case of copying thick documents such as a book or the like, the carrying mechanism 35 is rotated in the direction of the arrow C and placed on the document tray 9 so as to form a thick document carrying path. The action of the aforementioned parts which constitutes the copying apparatus is controlled by detecting document position through the use of switches 3A, 3B arranged in the document carrying path.

The provisions for adding an image projection device for projecting enlarged microfilm images, a document reducing image projection device or the like as an option device to the copying apparatus of the document moving type, has such advantages that the usable range of the copier is enlarged and user convenience is enhanced. Thus, the copying apparatus is increased in usable value. However, prior to the present invention, such a device of simple construction was not known. Further, if the apparatus is made with complicated construction, the usable value is lost. As apparatus from the prior art, in the system of projecting an optical image formed by an option device through an optical path of the copying apparatus itself, in order to converge a luminous flux of the projected image to a projection lens of the apparatus itself, it is necessary to improve the optical system by means such as interposition of a Fresnel lens or the like. Moreover, the type which uses the same optical path as that of the apparatus itself has been known as a one-shot exposure system, but the one-shot exposure system makes the copying apparatus large and does not adapt to the miniature and handy copying apparatus aimed by the present invention. The present invention, therefore, provides a copying apparatus having a simple construction for receiving an optical image from an option device in the copying apparatus of a document scanning and optical system fixing type.

FIG. 2a is a schematic view for explaining an embodiment of adding no option device to the copying apparatus of the document scanning and exposing system according to the present invention. The embodiment shown in FIG. 2a is almost the same as the construction of the apparatus shown in FIG. 1, except that a shutter 38 is added near the slit exposure optical system 11. The shutter 38 is formed of a vertically elongated plate-like member, held by a rotating support shaft 37 at the upper portion, and comprises a curved reflecting mirror portion 38a, a straight light intercepting plate portion 38b and a projecting portion 38c extended in the direction at 1a right angle thereto. These members are extended in the direction perpendicular to the plan of FIG. 2a, so as to prevent light radiated from the light source 10 from reaching the surface of the phtosensitive drum 12. The projecting portion 38c is inserted into a groove formed by light intercepting members 39 and 40 so as to sufficiently attain light intercepting purpose. The shutter 38 is biased in the direction of an arrow by means of coil springs or the like not shown. Moreover, levers 41 are integrally formed on both sides of the shutter 38. These levers 41 are arranged outside of the document running path and are not influenced by any external force when the option device is not used.

FIG. 2b is a schematic view for explaining the action of the shutter when an option device is added or mounted to the copying apparatus. When the upper portion 35 of the document scanning device, that is, the document feeder device is withdrawn to the left by rotating it around the shaft 36, the end of the additional optical path for an option device 50 is exposed to the outside of the copying apparatus, while members for forming the bottom of the option device 50 or members secured to the bottom push the levers 41 down, thereby automatically rotating the shutter 38 in the clockwise direction and opening a slit-like optical path P for the option device shown by a dotted line. The optional device 50 is so positioned that an optical path P' of the option device 50 is just placed at the position opposite to the optical path P, which is spaced from and substantially parallel to slit exposure optical system 11, so that the option device and the copying apparatus are correctly combined. In addition, at the time of using the option device 50, the upper carrying mechanism 35 for holding the rollers 4B, 5B on the document feeder device of the apparatus itself is withdrawn to the position determined by rotating it 180° around the shaft 36 in the counterclockwise direction.

Figure 3A:
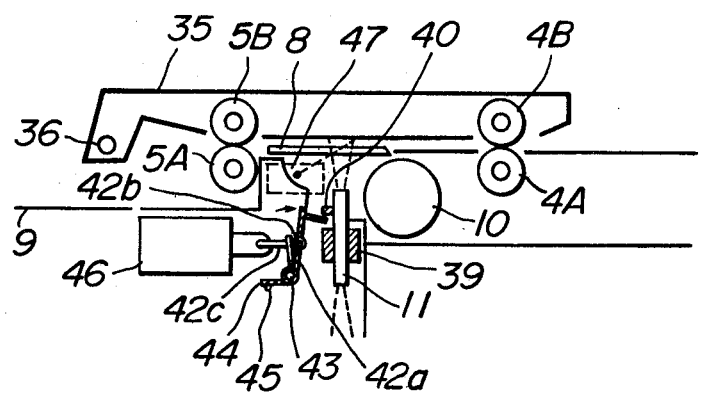
FIGS. 3a and 3b are sectional views showing another embodiment of the shutter drive mechanism of the copying apparatus according to the present invention.
Figure 3B:
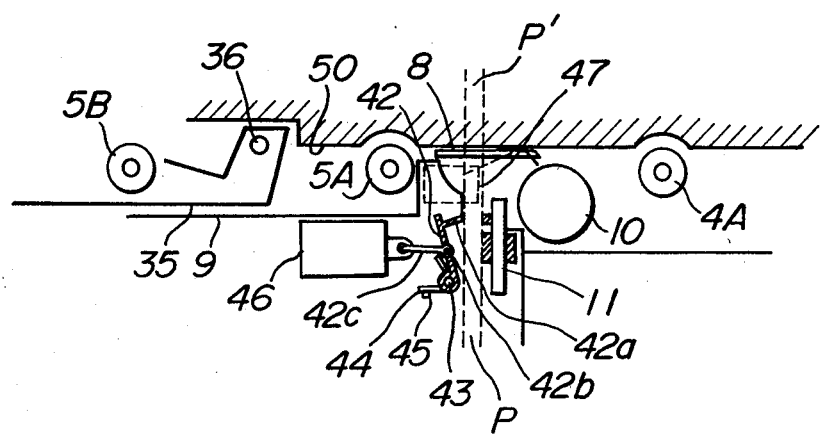

FIGS. 3a and 3b show another embodiment of the copying apparatus in which an independent optical path is formed by mounting the option device in the same manner. FIG. 3a is a schematic view for explaining the copying apparatus prior to mounting of the option device. In FIG. 3a, a shutter 42 for opening and closing an additional optical path for the option device is pivoted on a rotating shaft 43 and biased by the action of a spring 44 and a stopper 45 in the clockwise direction shown by an arrow. The shutter 42 is provided with a projecting portion 42a for closing the additional optical path by cooperating with the light intercepting members 39 and 40. On the other hand, a link lever 42c couples a plunger of a solenoid 46 and a shaft 42b attached to the end portion of the shutter 42, but the shutter has no influence when the solenoid is not energized. At the position near the end portion of the stage glass 8 there is arranged a microswitch 47 shown by a dotted line at the outside of the document running path. The actuator of the microswitch is projected upward from the stage glass 8, but the microswitch 37 is inactive under the state shown in FIG. 3a.

When the option device 50 is mounted on the copying apparatus, as shown in FIG. 3b, the actuator of the microswitch 47 is driven by the bottom plate of the option device 50 or a member provided to the bottom portion thereof so as to place the microswitch 47 in the ON state to energize the solenoid 46. When a plunger of the solenoid is displaced therein, the shutter 42 is rotated in the counterclockwise direction against the force of the spring 44 by the link 42c, so that the optical path P coupled to the optical path P' of the option device 50 is opened as shown by a dotted line.

The constructions shown in FIGS. 2 and 3 are made in such a manner that the opening and closing of the shutter 38 or 42 are automatically controlled by adding the option device 50 to the copying apparatus, but the invention is not limited thereto. For example, it is possible to open or close the shutter by a manual switching lever. In addition, it is preferable to open and close the shutter based on a signal which detects insertion of document to the option device, or to always open the shutter and to close the shutter by a signal based on insertion of document into the copying apparatus itself. The configuration of a shutter and the selection of an optical path opening or closing mechanism are a matter of design and do not relate to the essence of the present invention. It is also a design choice that the additional optical path P for the option device formed in the copying apparatus itself under the state of fixing the projection lens system of the apparatus is not straight but partly bent. Optical parts such as a mirror or the like are employed for use with a part of the optical path when making exposure in the copying apparatus itself. This also has no relation to the essence of the present invention.

Figure 4:
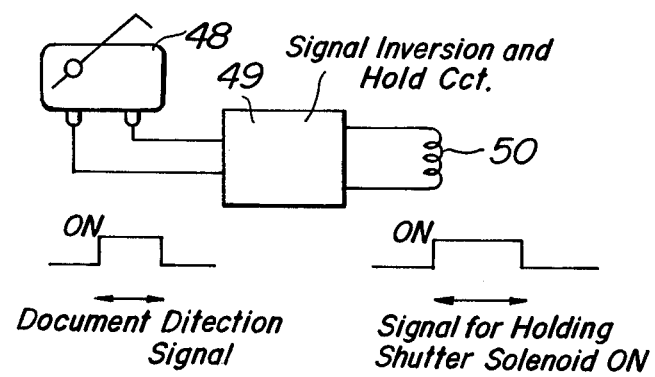
FIGS. 4 and 5 are circuit diagrams showing two embodiments of a control circuit for controlling the shutter drive mechanism.
Figure 5:
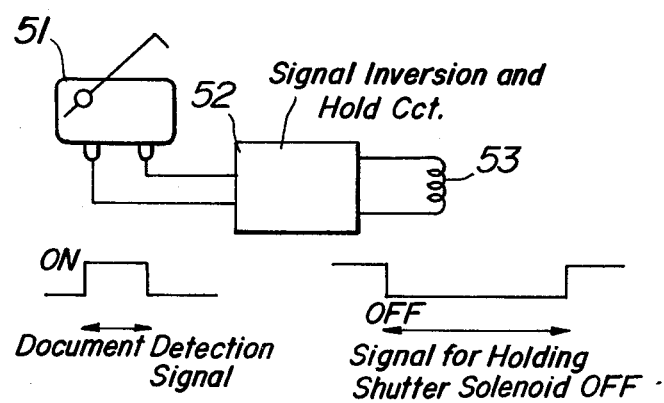

FIGS. 4 and 5 are schematic views for explaining a circuit construction for use in controlling the opening and closing of the shutter in relation to the insertion of a document. FIG. 4 is an embodiment for opening the shutter by detecting the state of inserting a document into the option device. A control signal is generated by detecting a document by a microswitch 48 provided in the option device. The signal is held until the document passes through an exposure window so that a solenoid 50 for opening the shutter is energized by the held signal. The hold action of the signal may be performed based on the leading edge of the document detection signal to continue for a predetermind time or started from the trailing edge of the document detection signal to continue for a predetermind time. The hold of a signal can be carried out with the use of a timer. The document detecting switch 48 should be placed on the upper stream side of a document to the exposure window.

FIG. 5 is an embodiment for opening and closing the shutter by detecting the document in the copying apparatus. That is, the shutter is always under the opening condition and closed by inserting a document into the copying apparatus. A control signal is generated when a microswitch 51 provided in the copying apparatus detects the document. The control signal is treated by a signal inversion and hold circuit 52, so that a solenoid 53 which opens the shutter assumes the OFF state, which is held for a predetermind time. The setting of the position holding action of the document detecting switch 51 is the same one as shown in FIG. 4.

The option device applied to the copying apparatus having an optical path for the option device will be outlined as follows.

Figure 6:
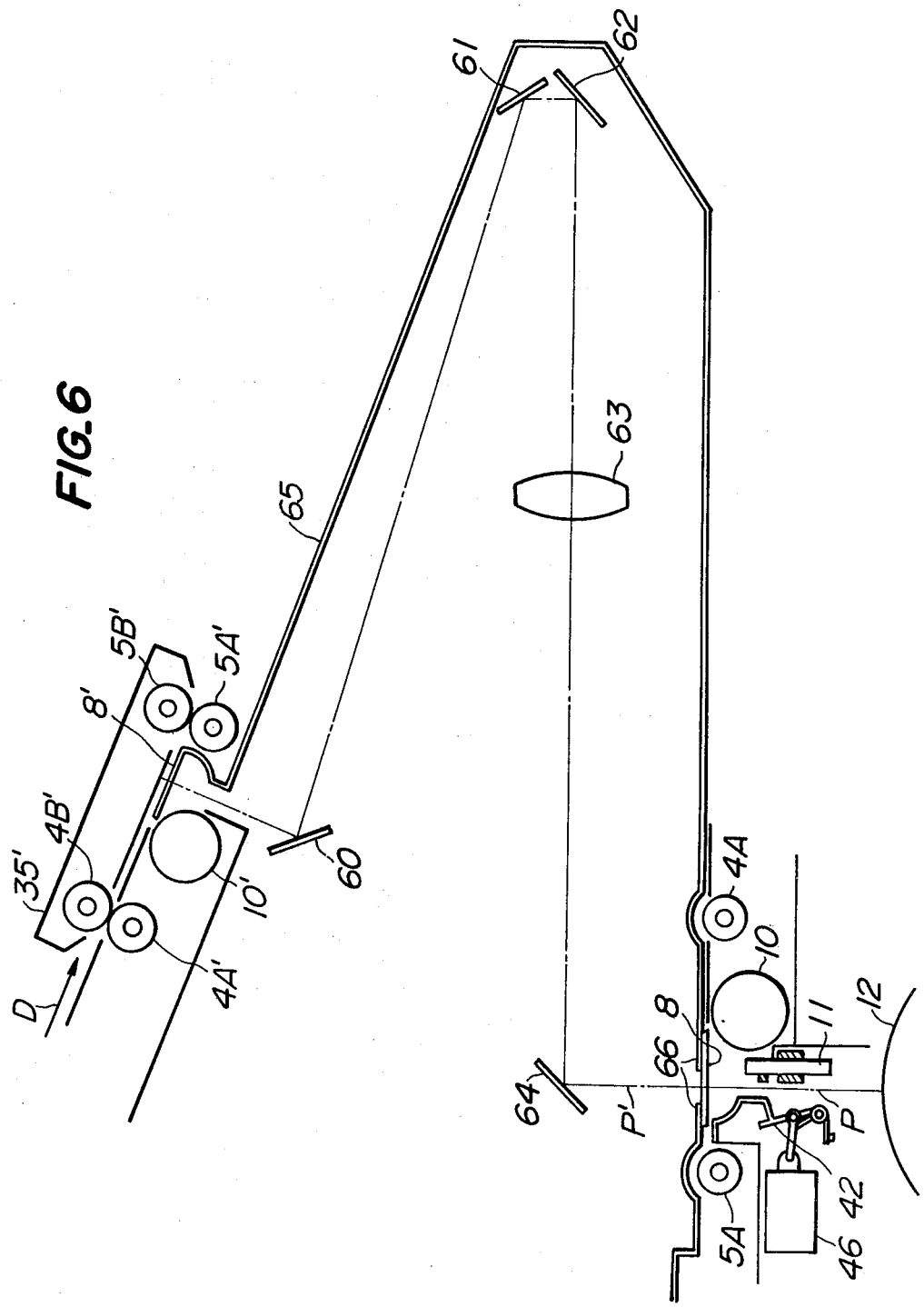
FIGS. 6 and 7 are schematic sectional views showing two embodiments of an option device loaded on the copying apparatus according to the present invention.

FIG. 6 is an embodiment of the option device for projecting a reduced image of the document. A document feeder device and an illumination device of the option device are constructed in the same manner as illustrated in FIGS. 1, 2a and 3a. That is, the document is inserted from the direction of an arrow D, and the members indicated by primed reference numerals are actuated in the same manner as shown in FIG. 1 by the members having the same unprimed numbers. The light reflected from the document is projected on the photosensitive drum 12 via the optical path P for the option device of the copying apparatus itself and through mirrors 60, 61, 62, a lens 63 and a mirror 64. A housing 65 of the option device intercepts external light and a diaphragm plate 66 controls a width of projected flux to prevent the light radiated by the option device from being projected onto the slit exposure optical system 11. When there is no diaphragm plate 66 and the optical system 11 is exposed by the projected flux, it is necessary to provide another shutter for intercepting the optical path of the optical system 11. The optical path P for the option device can be opened and closed by a shutter mechanism as explained in FIG. 3.

Figure 7:
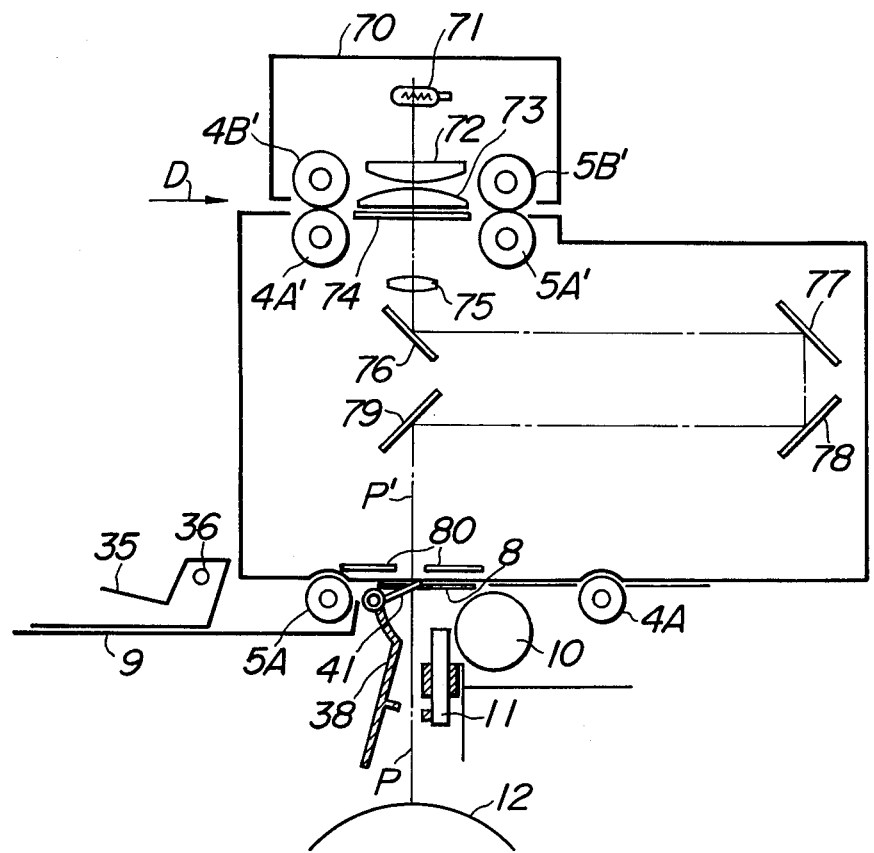

FIG. 7 is a schematic view for explaining the details of mounting an option device that projects a microfilm image enlarged projection on the copying apparatus. FIG. 7 shows an embodiment designed for receiving an apertured card type microfilm. The apertured card is conveyed by rollers 4A', 4B', 5A' and 5B' in the same manner as the carrying of the document shown in FIG. 1. In a housing 70 there are provided a light source 71 and condenser lenses 72 and 73. The apertured card moves between the condenser lens 73 and a stage glass 74. A microfilm image is enlarged and projected by an enlarging and projecting lens 75. The mircrofilm image is projected on the photosensitive drum 12 through the additional optical path P of the copying apparatus and through mirrors 76, 77, 78, 79 and a diaphragm plate 80.

As explained above in detail, the copying apparatus according to the present invention comprises a fixed slit exposure optical system, means for moving and scanning a document, an independent optical path apart from the original optical path of the copying apparatus itself for receiving an image projected and scanned by the option device, one end of the independent optical path being exposed to the outside of the apparatus itself, and a shutter for closing the optical path when the option device is not used, so that many objects of the present invention can effectively be attained.

What is claimed is:

1. In a copying apparatus having a fixed light source, a fixed elongated optical system defining a first optical path for making a slit exposure, means for moving and scanning a document, a photosensitive member arranged to receive an optical image formed by the optical system in synchronization with the scanning of the document, and an option device capable of being detachably mounted to the apparatus to copy an optical image projected from the option device, the improvement comprising an elongated second optical path spaced from and substantially parallel to said first optical path of the fixed elongated optical system of the copying apparatus, and an elongated shutter mechanism for opening and closing the second optical path, said shutter mechanism being opened when the option device is added to the copying apparatus for directly projecting on the photosensitive member through the second optical path an optical image formed by the option device.

2. In a copying apparatus having a fixed light source, a fixed elongated optical system defining a first optical path for making a slit exposure, means for moving and scanning a document, a photosensitive member arranged to receive an optical image formed by the optical system in synchronization with the scanning of the document, and an option device capable of being added to the apparatus to copy an optical image projected from a second optical path spaced from and substantially parallel to said first optical path of the fixed optical system of the copying apparatus, and an elongagted shutter mechanism for opening and closing the second optical path, said shutter mechanism being opened when the option device is added to the copying apparatus for directly projecting on the photosensitive member through the second optical path an optical image formed by the option device, and wherein the second optical path has one end being exposed to the outside of the copying apparatus and the other end being opposed to the photosensitive member.

3. In a copy apparatus of the moving document type, the apparatus having a fixed elongated optical system for providing an elongated first optical path, and capable of copying an optical image projected from an option device onto a photosensitive member, said option device being detachably mounted, the improvement comprising:
   means for providing an elongated second optical path spaced from and substantially parallel to said first optical path of the fixed optical system;
   elongated shutter means arranged near the elongated optical system for opening and closing the second optical path, and
   means for causing said shutter means to open the second optical path when the option device is added to the copying apparatus for directly projecting on the photosensitive member through the second optical path an optical image formed by the option device.

4. In a copying apparatus having a fixed light source, a fixed optical system for making a slit exposure, means for moving and scanning a document, a photosensitive member arranged to receive an optical image formed by the optical system in synchronization with the scanning of the document, and an option device capable of being added to the apparatus to copy an optical image projected from the optical path adjacently provided to an optical path of the fixed optical system of the copying apparatus, and a shutter mechanism for opening and closing the additional optical path, said shutter mechanism being opened when the option device is added to the copying apparatus for directly projecting on the photosensitive member through the additional optical path an optical image by the option device, and wherein the shutter mechanism comprises a vertically elongated plate-like shutter member having one end held by a pivot for intercepting the additional optical path, a lever extended to the side of the pivot opposite the shutter member and for opening the additional optical path when the option device is added to the copying apparatus and a spring means for always biasing the shutter member to the additional optical path closing direction, wherein said shutter member further comprises a curved reflecting mirror portion, a straight light intecepting plate portion and a projecting portion extended in the direction at right angles thereto.

5. In a copying apparatus having a fixed light source, a fixed optical system for making a slit exposure, means for moving and scanning a document, a photosensitive member arranged to receive an optical image formed by the optical system in synchronization with the scanning of the document, and an option device capable of being added to the apparatus to copy an optical image projected from the optical path adjacently provided to an optical path of the fixed optical system of the copying apparatus, and a shutter mechanism for opening and closing the additional optical path, said shutter mechanism being opened when the option device is added to the copying apparatus for directly projecting on the photosensitive member through the additional optical path an optical image formed by the option device, and wherein the shutter mechanism comprises a shutte member having one end held by a pivot for intercepting the additional optical path, a solenoid connected to the shutter member for opening the additional optical path when the option device is added to the copying apparatus, and a spring means connected to end of the shutter member for always biasing the shutter member to the additional optical path closing direction.

6. A copying apparatus as claimed in claim 5, wherein the shutter member has a projecting member provided at the end portion of the shutter member opposite to the pivotal end and extended in the direction at right angles thereto.

7. In a copying apparatus having a fixed light source, a fixed optical system for making a slit exposure, means for moving and scanning a document, a photosensitive member arranged to receive an optical image formed by the optical system in synchronization with the scanning of the document, and an option device capable of being added to the apparatus to copy an optical image projected from the optical path adjacently provided to an optical path of the fixed optical system of the copying apparatus, and a shutter mechanism for opening and closing the additional optical path, said shutter mechanism being opened when the option device is added to the copying apparatus for directly projecting on the photosensitive member through the additional optical path an optical image formed by the option device, and wherein the option device is means for projecting a reduced image of the document.

8. In a copying apparatus having a fixed light source, a fixed optical system for making a slit exposure, means for moving and scanning a document, a photosensitive member arranged to receive an optical image formed by the optical system in synchronization with the scanning of the document, and an option device capable of being added to the apparatus to copy an optical image projected from the optical path adjacently provided to an optical path of the fixed optical system of the copying apparatus, and a shutter mechanism for opening and closing the additional optical path, said shutter mechanism being opened when the option device is added to the copying apparatus for directly projecting on the photosensitive member through the additional optical path an optical image formed by the option device, and wherein the option device is means for projecting an enlarged image of the document.

* * * * *